United States Patent [19]

Satomura et al.

[11] Patent Number: 4,731,668
[45] Date of Patent: Mar. 15, 1988

[54] IMAGE READING APPARATUS INCLUDING MEANS FOR ACCURATELY DETERMINING THE LOCATION OF READ IMAGE INFORMATION

[75] Inventors: Hiroshi Satomura, Hatogaya; Takeshi Honjo, Kawasaki; Takashi Saito, Ichikawa; Tatsuo Takeuchi; Tadashi Ishikawa, both of Tokyo; Masataka Naito, Kawasaki; Sachiko Naito, Kawasaki; Masanori Yamada, Kawasaki, all of Japan

[73] Assignee: Canon Kabushiki Kaisha, Tokyo, Japan

[21] Appl. No.: 63,725

[22] Filed: Jun. 16, 1987

Related U.S. Application Data

[63] Continuation of Ser. No. 642,269, Aug. 20, 1984, abandoned.

[30] Foreign Application Priority Data

Aug. 26, 1983 [JP] Japan .................................. 58-156689

[51] Int. Cl.⁴ .......................... H04N 1/00; H04N 1/10
[52] U.S. Cl. ..................................... 358/256; 358/293; 382/59
[58] Field of Search ............... 358/256, 285, 293, 294; 382/48, 61, 59

[56] References Cited

U.S. PATENT DOCUMENTS 4,260,979  4/1981  Smith ..................................... 382/59
4,523,235  6/1985  Rajchman ........................... 358/256
4,574,317  3/1986  Scheible .............................. 358/285

Primary Examiner—Howard W. Britton
Assistant Examiner—John K. Peng
Attorney, Agent, or Firm—Fitzpatrick, Cella, Harper & Scinto

[57] ABSTRACT

An image reading apparatus comprises, in a preferred embodiment, LEDs and image sensors for reading image and location information of an original, another LED and a photo sensor for generating a read start clock, memories for storing the image and location information read by the image sensors in one-to-one correspondence, a transparent sheet with matrix stripes placed on the original to provide the location information of each image information, and a CPU for controlling the operation sequence and detecting a ramp in the reading apparatus.

20 Claims, 10 Drawing Figures

IMAGE READING APPARATUS INCLUDING MEANS FOR ACCURATELY DETERMINING THE LOCATION OF READ IMAGE INFORMATION

This application is a continuation of application Ser. No. 642,269 filed Aug. 20, 1984, now abandoned.

BACKGROUND OF THE INVENTION

1. Field of the Invention

The present invention relates to an image reading apparatus for reading image information.

2. Description of the Prior Art

Various types of conventional apparatuses have been reported which read image information by using line sensors or contact sensors.

When image information is read by a contact reading apparatus which is brought into tight contact with the surface of an original, the reading apparatus is fixed in position while the original is fed at a constant speed according to a conventional method. However, it is difficult for this conventional reading apparatus to record an original such as a thick book or the like. In addition to this disadvantage, an original feed apparatus is required to feed the original at a constant speed, resulting in a large size and high cost. In order to overcome these drawbacks, a method is proposed wherein an original is fixed while a reading apparatus is moved. In this case, an original feed apparatus is not required. However, when the reading apparatus is fed at an arbitrary speed along an arbitrary direction, the image is recorded twice or partially omitted, resulting in inconvenience. In addition to these disadvantages, the feed speed and direction of the reading apparatus are limited, resulting in a large size and high cost. In addition, information pertaining to the location of the image information on the original (hereinafter "location information of the image") cannot be obtained.

SUMMARY OF THE INVENTION

It is an object of the present invention to eliminate the above drawbacks.

It is another object of the present invention to improve an image reading apparatus.

It is still another object of the present invention to provide an image reading apparatus which can be fed at an arbitrary speed.

It is still another object of the present invention to provide an image reading apparatus for preventing image reading errors.

It is still another object of the present invention to provide an image reading apparatus for recognizing location information of image information.

It is still another object of the present invention to provide an image reading apparatus capable of detecting a ramp state in scanning.

It is still another object of the present invention to provide an image reading apparatus for issuing an alarm to warn of a reading error.

The above and other objects, features and advantages of the present invention will be apparent from the following detailed description in conjunction with the accompanying drawings.

DETAILED DESCRIPTION OF THE PREFERRED EMBODIMENTS

The present invention will be described in detail with reference to the accompanying drawings.

Figure 1:
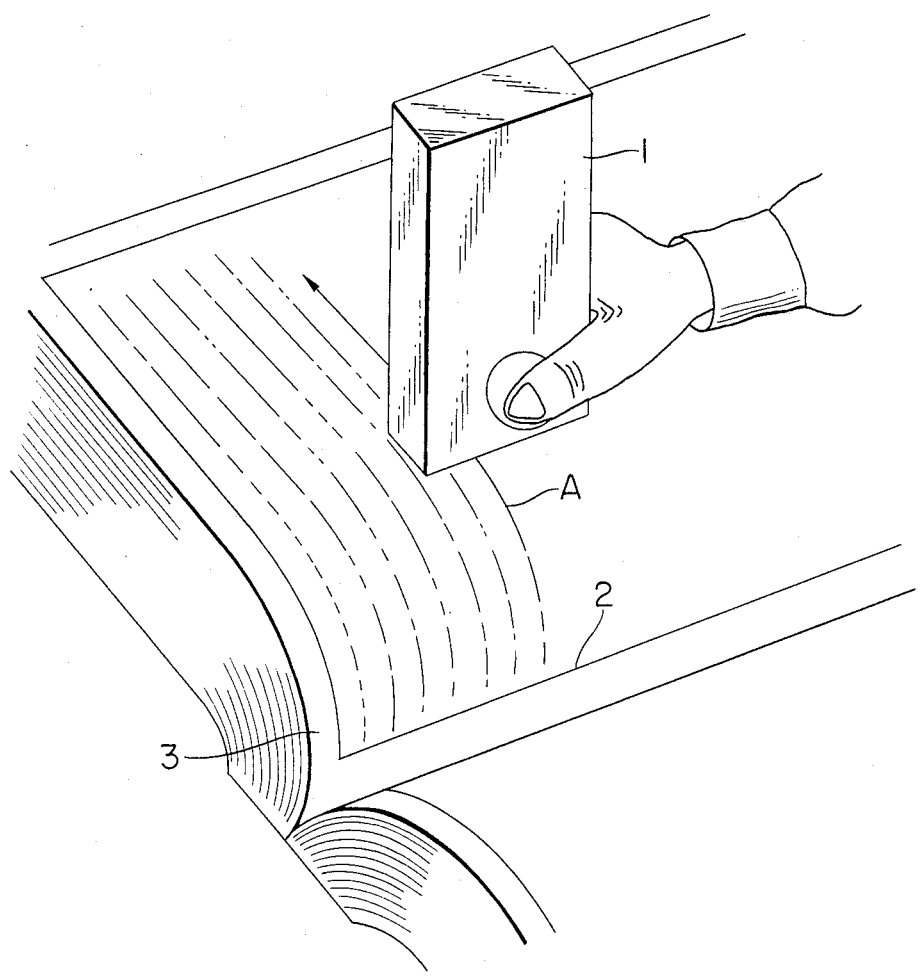
FIG. 1 is a perspective view showing the outer appearance of an image reading apparatus according to an embodiment of the present invention.

FIG. 1 shows an image reading apparatus to which the present invention can be applied. Referring to FIG. 1, a portable image reading apparatus 1 is brought into contact with a location information detection transparent sheet 2. The transparent sheet 2 is placed on an original 3 to be recorded. The portable image reading apparatus 1 is moved along a direction indicated by arrow A.

Figure 2:
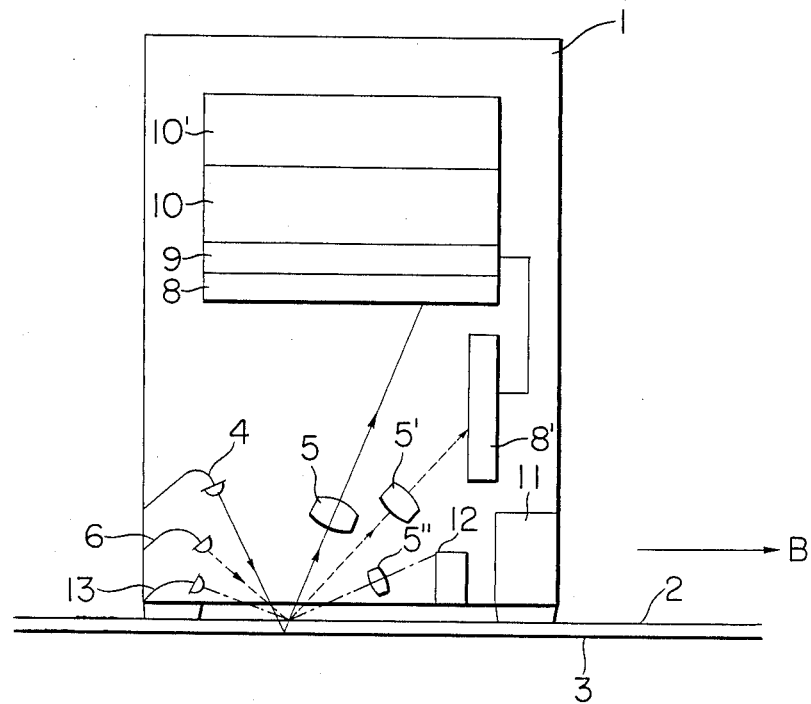
FIG. 2 is a sectional view of the image reading apparatus.
Figure 3:
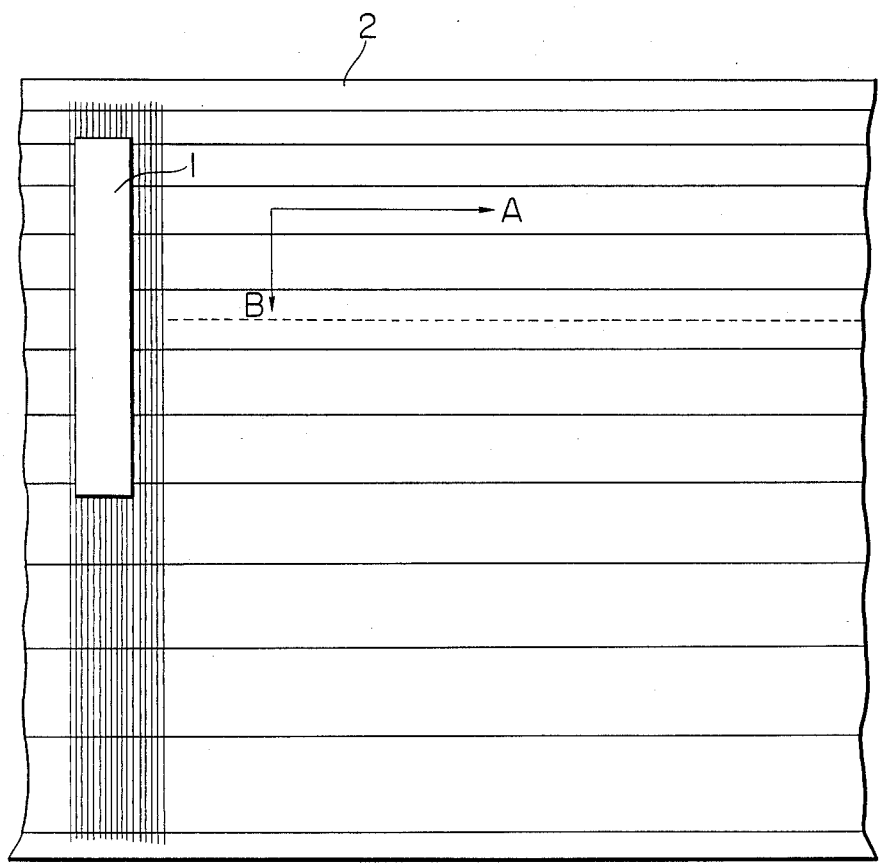
FIG. 3 shows a transparent sheet for detecting location information.

FIG. 2 is a sectional view of this image reading apparatus. Stripes are formed by a chemical treatment (i.e., etching) in a surface of the transparent sheet 2 along a direction perpendicular to a subscan direction A. The stripes are equidistantly spaced apart at a (see FIG. 1) density of 8 stripes/mm, and each stripe has a width of 50$\mu$. Along a main scan direction (direction indicated by arrow B), stripes are similarly formed in the sheet from its one end in such a manner that intervals are gradually increased. Any two adjacent stripes along the B direction have an interval difference more than the size of a pel of an image sensor 8. More specifically, if an initial interval between the first two stripes is given to be a mm, and an increment in the adjacent two stripe intervals is given to be 1 mm, the stripes are etched from one end of the transparent sheet 2 at increasing intervals a, a+1, ..., a+n, ... Since the transparent sheet 2 has an etched surface bearing the matrix stripes, reflection and transmission of light occur selectively in accordance with the angles of incidence of light. FIG. 3 shows the matrix stripes of the transparent sheet 2 in association with the image reading apparatus 1. It should be noted here that reference symbol A denotes a subscan direction, and B, the main scan direction. LED light sources 4, 6 and 13 serve as image information reading, location information reading and clock generation light sources, respectively. The LED arrays 4 and 6 are aligned along the A direction.

Light from the LED light source 4 can be incident on the transparent sheet 2 at an angle (more than 60° in this embodiment) to illuminate the original 3 even if the light irradiates the stripes. Light reflected by the original 3 is focused as image information on the image sensor (CCD) 8 through a lens 5.

Light from the LED light source 6 is reflected by an etched stripe in the transparent sheet 2 (although this light is incident on the sheet 2 at an angle of 30°). The light reflected by the transparent sheet 2 is focused on an image sensor 8' through a lens 5'. Location information pertaining to location along the main scan direction B is determined such that the light reflected by the stripes having the increasing intervals along the B direction is focused on the image sensor 8'. In other words, since the intervals between any two adjacent stripes differ from each other (i.e., any two intervals are different), the location on the transparent sheet 2 can be immediately determined when a given stripe interval is detected. (This is sometimes referred to hereinafter as "absolute location information.")

Recording along the subscan direction A is performed as follows. Light emitted from the LED light source 13 and reflected by the stripes formed at a density of 8 stripes/mm along the direction perpendicular to the A direction is detected by a photo sensor 12 through a lens 5". An output from the photo sensor 12 is used as a read start clock. (Photosensor 12 thus serves as a detector to provide what is sometimes hereinafter called "relative location information.") A control circuit 9 for the image sensors 8 and 8' is driven in response to this clock so as to drive the image sensors 8 and 8' in units of stripes, thereby performing subscan recording. For example, each of the image sensors 8 and 8' has n pels each of which corresponds to an image surface portion of about ⅛ mm. Therefore, each image sensor has an 8-pel resolution. Every time the photo sensor 12 detects 8 stripes/mm etched along the direction perpendicular to the A direction, the image sensors 8 and 8' are operated to record one-line data having n pels. The image sensors 8 and 8' are arranged along the same direction. Memories 10 and 10' store location information read by the image sensors 8 and 8', respectively. A battery 11 comprises a dry cell for operating the image reading apparatus, so that the apparatus can be made compact and portable so as to read image information anywhere at any time.

If the wavelength of light provided by the light source is rendered variable, only one light source need be used. The single light source is sequentially operated at different wavelengths, instead of turning on the LED arrays 4, 6 and 13.

Figure 4:
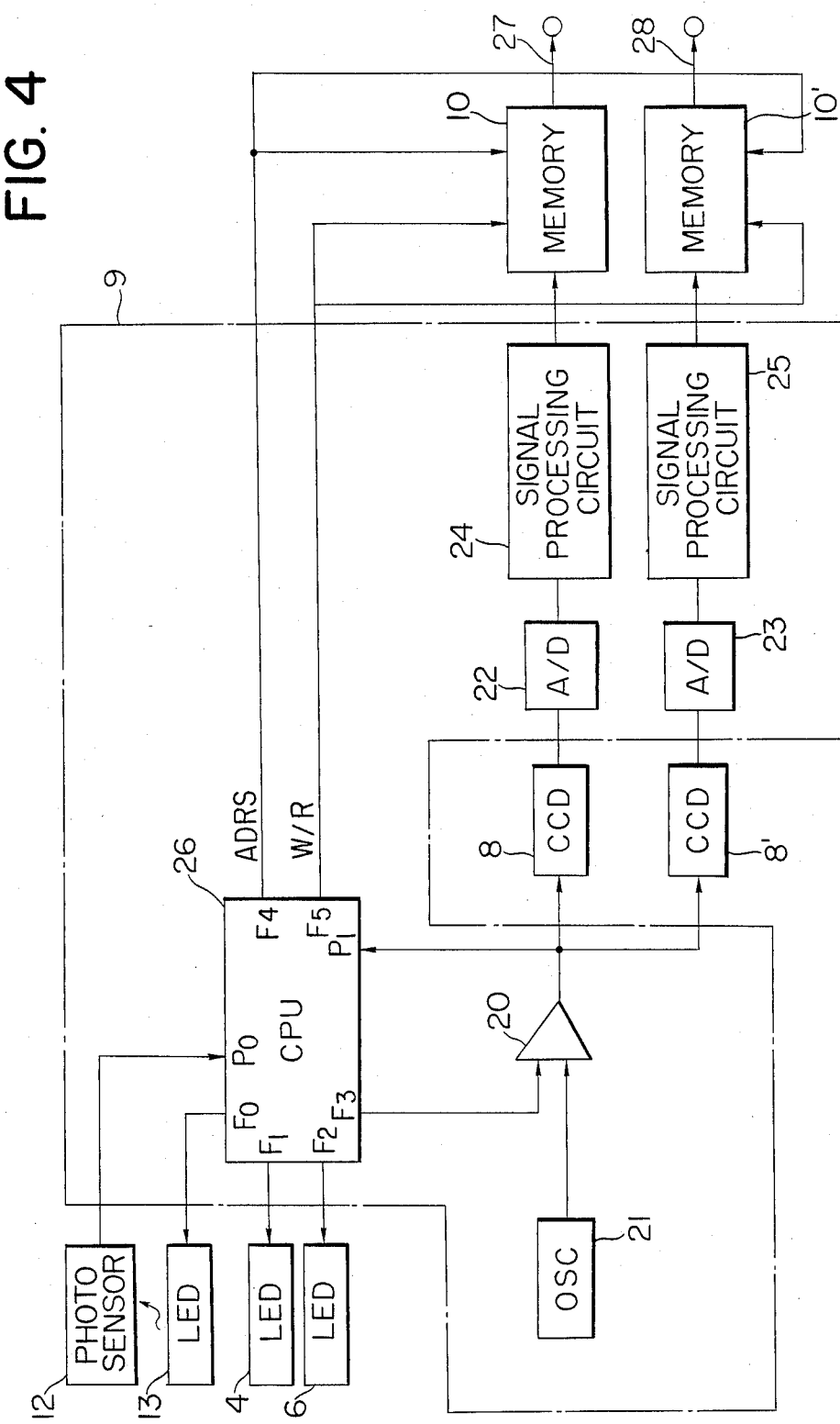
FIG. 4 is a block diagram of the image reading apparatus.
Figure 5:
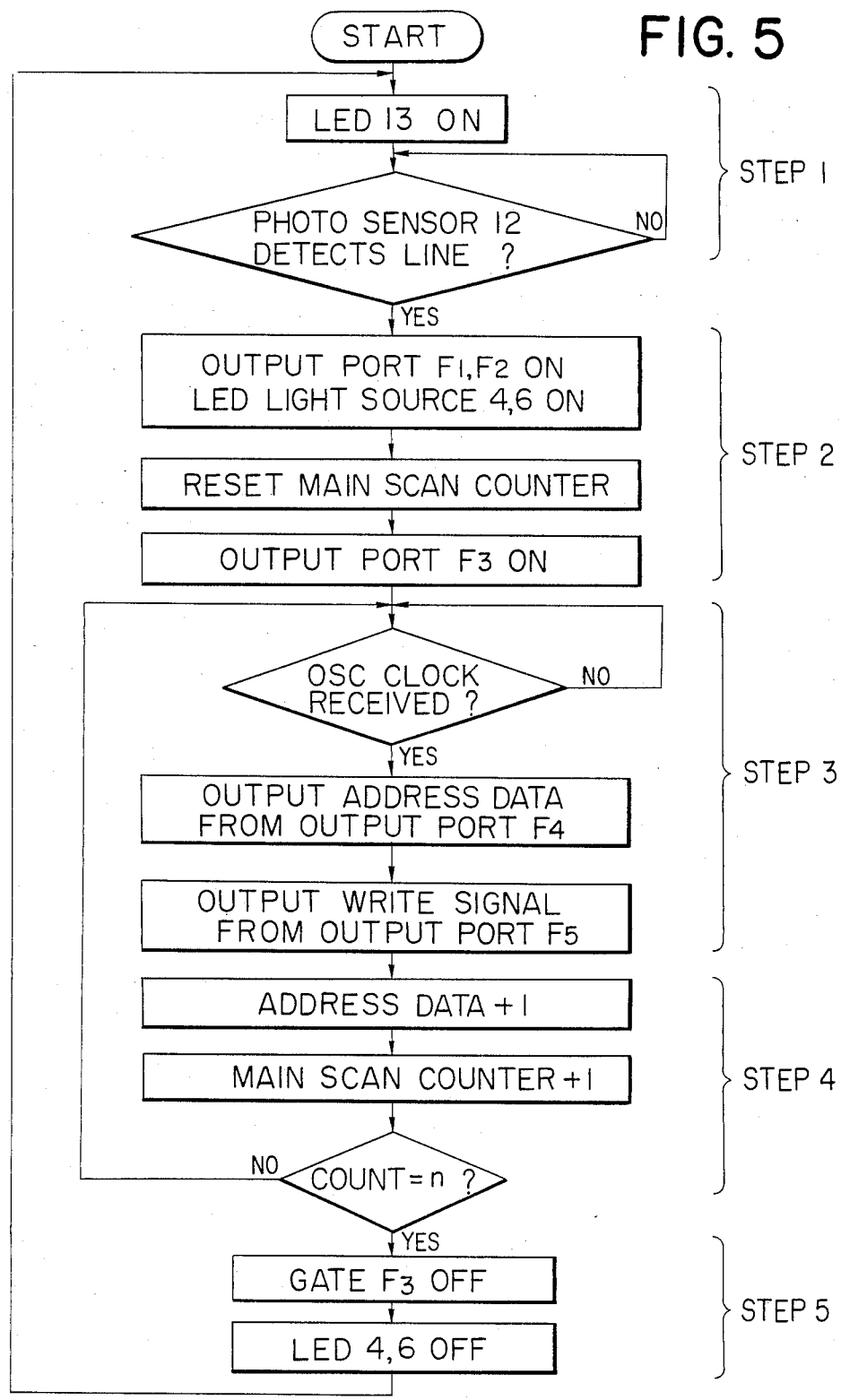
FIG. 5 is a flow chart showing a control program of the image reading apparatus.

FIG. 4 is a block diagram of the image reading apparatus according to an embodiment of the present invention. The control unit 9 comprises a main component a known one-chip microcomputer (CPU) 26 incorporating a ROM and a RAM. The image reading apparatus is controlled in accordance with a program stored in the ROM. FIG. 5 is a flow chart for explaining the operation of the control program. The operation of the image reading apparatus will be described with reference to FIGS. 4 and 5.

When the operator places the image reading apparatus on a surface of an image 3 through the transparent sheet 2 and moves the apparatus along the A direction while the apparatus is brought into tight contact with the transparent sheet 2, as shown in FIG. 1, an output port F0 is enabled to turn on the LED array 13 in step 1. Light reflected by the above-mentioned stripes is detected by the photo sensor 12, and a detection signal is supplied to an input port P0 so as to determine whether or not the stripes are detected. When the stripes are detected, the flow advances to step 2.

Output ports F1 and F2 are enabled to turn on the LED arrays 4 and 6 so as to obtain image information and location information, in step 2. A main scan counter, to be described later, is reset. An output port F3 is enabled to open a gate 20 so as to store data from the CCDs 8 and 8' in the memories 10 and 10', and the flow advances to the next step.

When the LED arrays 4 and 6 are turned on, reflected light rays become incident on the image sensors 8 and 8' and are stored as analog image and location information signals in the respective pels.

The gate 20 is enabled, to couple an output as read clocks from a reference oscillator (OSC) 21 to the image sensors 8 and 8'. The analog signals from the respective pels are sequentially read out as serial data. More specifically, these analog signals are converted by A/D converters 22 and 23 to digital data having a predetermined number of bits. The digital data are then converted by image signal processing circuits 24 and 25 to binary signals which are then stored as video data in the memories 10 and 10', respectively. In addition, when the gate 20 is enabled, the output from the reference oscillator 21 is supplied to an input port P1.

In step 3, the clocks from the OSC 21 are continuously monitored. When the OSC clock is detected, address data is generated from an output port F4 in synchronism with the OSC clocks to determine the addresses of the memories 10 and 10' for storing the video data. A W/R signal for the memories 10 and 10' is set in the write mode and is generated from an output port F5, thereby storing the video data in a memory area at predetermined addresses. In step 4, the address data is incremented by one to determine the address for the next pel. At the same time, the main scan counter corresponding to the n pels of the CCD is incremented until the count reaches n. However, when the count has not reached n, the flow returns to step 3 wherein the video data corresponding to the next pels are repeatedly stored in synchronism with the corresponding clocks. When the count of the main scan counter has reached n, the one-line image information and one-line position information of the CCD along the main scan direction have been completely read, and the gate 20 is disabled (i.e., the output port F3 is disabled). In addition, the LED arrays 4 and 6 are turned off (i.e., the output ports F1 and F2 are disabled) (step 5), and the flow returns to step 1. The image reading apparatus is set in the standby mode until another stripe signal (read start signal) from the photo sensor 12 is received by the CPU 26. In this manner, every time the stripes etched along the direction perpendicular to the A direction are detected, the LED arrays 4 and 6 are turned on to cause the image sensors 8 and 8' to read the image information and the location information which are then stored in memory locations at predetermined addresses of the memories 10 and 10', respectively. Identical image information is often read and stored in the memories 10 and 10' since an arbitrary image area is scanned. However, each image information and the corresponding location information are stored in the memories 10 and 10', respectively, thereby preventing double storage. In order to read out the image information and the location information respectively from the memories 10 and 10', the R/W signal is set in the read mode to access predetermined addresses thereof, so that memory outputs 27 and 28 can be easily read out from the memories 10 and 10', respectively.

Figure 6:
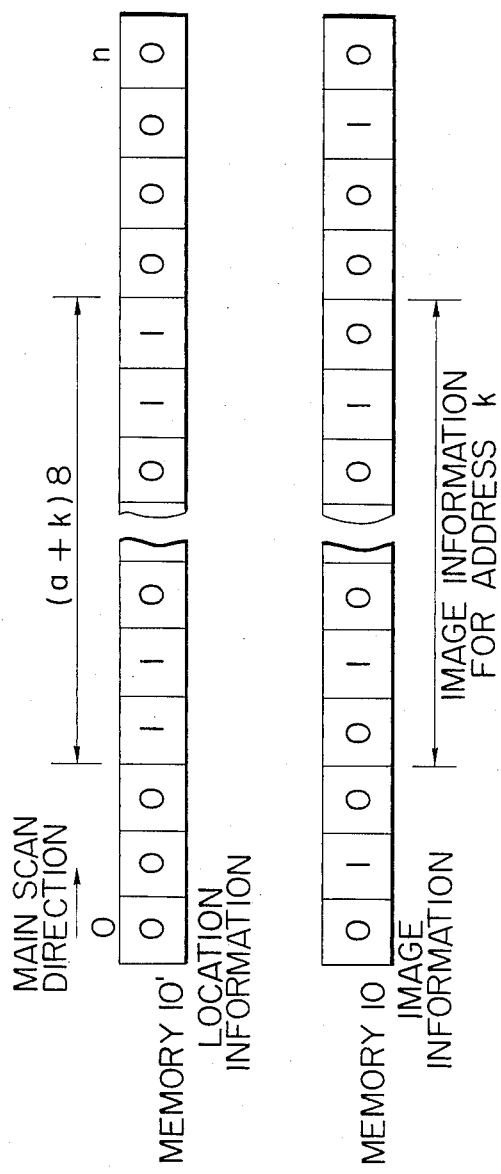
FIG. 6 is a representation showing an example of data stored in a memory.

As is apparent from the above description, the image information and the location information are respectively stored in the memories 10 and 10' in one-to-one correspondence. FIG. 6 shows the data stored in the memories 10 and 10'. The data in the memory 10' has n bits along the main scan direction. A bit of logic "0" in the memory 10' indicates that a stripe is not detected, and a bit of logic "1" indicates that a stripe is detected. The data in the memory 10 also has n bits. However, a bit of logic "0" in the memory 10 indicates that the density of the image represents nearly white, and a bit of logic "1" indicates that the density of the image represents black. The number of bits between adjacent bits of logic "1" in the location information in the memory 10' indicates the distance between the two adjacent etched stripes. In order to detect the number of bits between the bits of logic "1", an external editing device (not shown) connected to the output 28 counts the number of bits. When the number M of bits between the two adjacent bits of logic "1" is detected, the distance between the two adjacent stripes can be determined in accordance with the resolution of the CCD. In other words, if the resolution of the CCD is given by 8 pels/mm, the distance L between two adjacent stripes is given by $L=M/8$. If the initial stripe interval is given to be a mm and an increment is given to be 1 mm, an address k of the location information is derived to be $k=L-a$. In other words, the number of bits corresponding to the stripe internal is $8\times(a+k)$. Since the image information corresponds to the location information in a one-to-one relationship, the data in the memory 10 which corresponds to the number, i.e., $8\times(a+k)$ in the memory 10' is easily detected as the image information at the address k.

A case will be described wherein the image reading apparatus according to the present invention is moved obliquely with respect to the main scan direction B. When the image sensor 8 has such a number of pels as to detect at least three stripes along the B direction, the image information and the corresponding location information within two or more stripe intervals can be stored in the memories 10 and 10', respectively.

Figure 7:
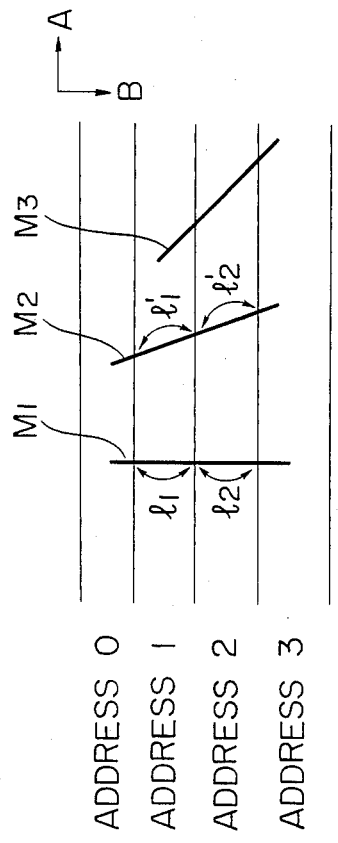
FIG. 7 is a representation showing reading positions of an image sensor.

Referring to FIG. 7, when a case M1 is given wherein the image sensor 8 is moved substantially parallel to the main scan direction B, the image sensor 8 reads address 1 and address 2, so that the distance data are stored at address 1 and address 2 of memory 10 so as to satisfy $l1=8\cdot(a+1)$ and $l2=8\cdot(a+2)$, respectively. However, in a case M2 wherein the image sensor 8 is moved obliquely with respect to the main scan direction B (hereinafter the term "ramp" will sometimes be used to designate such oblique movement, and specifically to indicate the magnitude of the obliqueness), the image sensor 8 reads distance data $l1'$ and $l2'$ as stripe intervals of addresses 1 and 2. The data $l1'$ and $l2'$ differ from the data $l1=8\cdot(a+1)$ and $l2=8\cdot(a+2)$, respectively. However, by utilizing relation $l1: l2=l1':l2'$, the location information at the time of oblique scanning can be calculated in a manner shown in FIG. 8.

A value $l1'/l2'$ is calculated and is substituted into x (step 11). The address k is reset to zero, and x is sequentially compared with $a/(a+1)$, $(a+1)/(a+2)$, ..., and $(a+N)/(a+N+1)$, where N is the number of stripes along the main scan direction B, so that a maximum address becomes N. When x becomes equal to $(a+k)/(a+k+1)$, k represents the address, thereby determining the location information (step 13).

Figure 8:
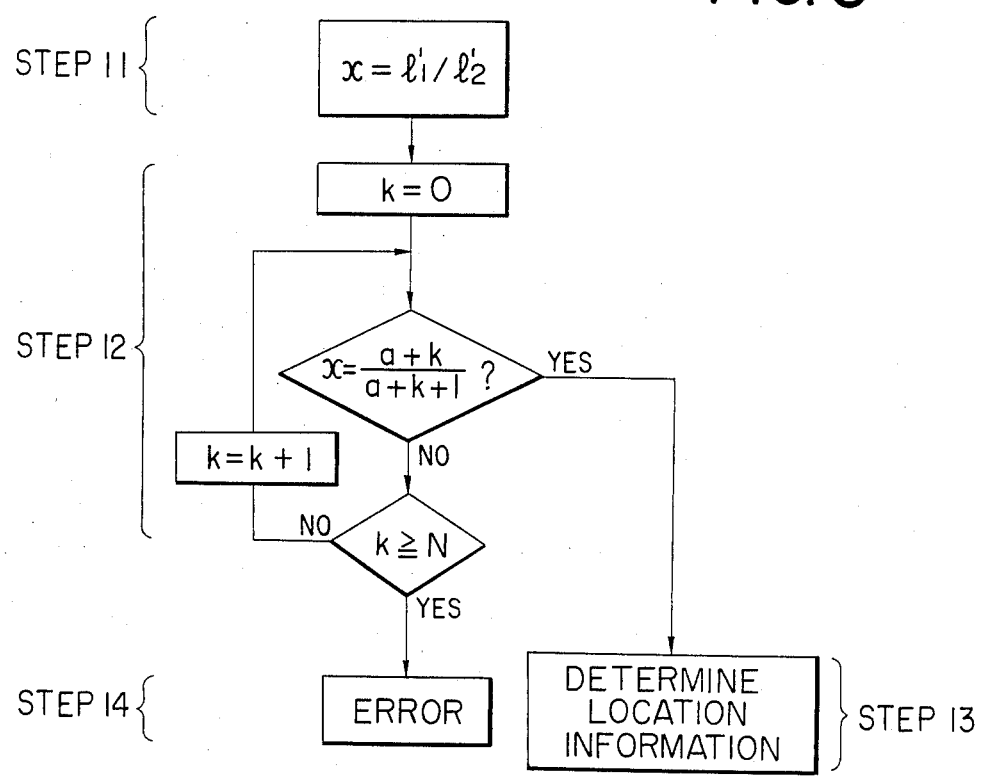
FIG. 8 is a flow chart showing a location information determining program.

However, when a case M3 for the image sensor 8 is given, as shown in FIG. 7, i.e., when scanning of the image sensor 8 is performed across not more than two stripes, the location information cannot be determined, resulting in a scanning error. If any value does not correspond to the value $l1'/l2'$, a scanning error is also detected, as shown in FIG. 8. Thus, this arrangement provides additional information which facilitates image reading, and thus the pertinent parts of the arrangement will sometimes be termed "providing means" hereinafter, in the sense that they "provide" additional information available for use in the image reading.

Figure 9:
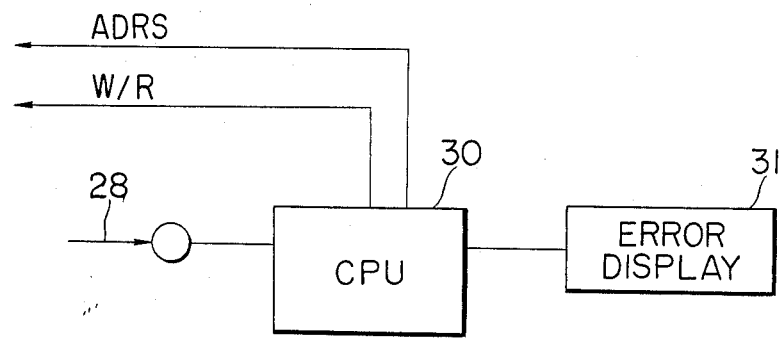
FIG. 9 is a block diagram for performing the flow chart of FIG. 8.
Figure 10:
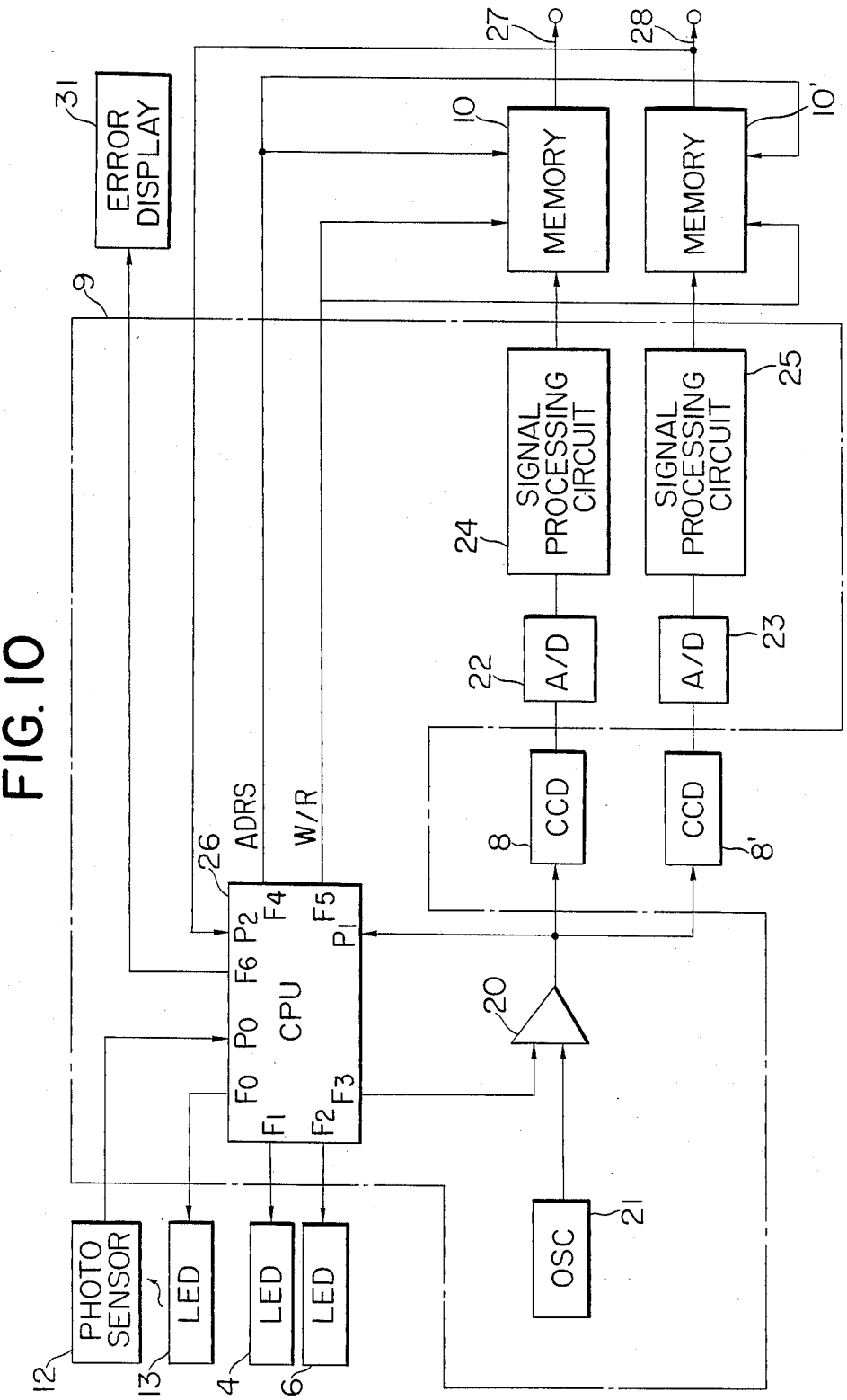
FIG. 10 is a block diagram of an image reading apparatus according to another embodiment of the present invention.

Error detection is performed by using a CPU 30, as shown in FIG. 9. The read/write signal W/R for the memories 10 and 10' is set in the read mode, and n bit location information data are sequentially read out from the memory 10' in response to address signals ADRS. When three or more stripes cannot be detected, and the location information cannot be determined, as shown in FIG. 8, an error is displayed on an error display 31 to signal a read error to the operator. When a read error occurs, the read inhibition may be performed at the reading section.

The CPU 30 may be incorporated in the image reading apparatus or in an external editing apparatus. Alternatively, the CPU 30 may be substituted for by the CPU 26 shown in FIG. 4. In this case, the location information from the output 28 is supplied to the input port P2 of the CPU 26, and proper arithmetic operation is performed to determine the location information.

Furthermore, the arithmetic operation for determining the location information may be performed immediately after the image information and the corresponding location information are received by the photo sensor 12. Alternatively, the arithmetic operation may be performed after data of a few lines are read, or when the data is edited by the external device.

Even if the image reading apparatus is moved obliquely with respect to the main scan direction, the location information can be accurately detected, and the corresponding image information can be obtained. Even if an error occurs, the error is immediately displayed, thereby freeing the operator from cumbersome operation.

The present invention is not limited to the particular embodiments illustratively described herein. Various changes and modifications may be made within the spirit and scope of the invention and the appended claims.

What we claim is:

1. An image reading apparatus comprising:
reading means for reading an image of an original and for outputting an electrical signal corresponding thereto, said reading means being capable of starting its reading operation from any location on the original;
first detecting means for detecting absolute location information, in a first specified direction, of the original image read by said reading means; and
second detecting means for detecting relative location information, in a second specified direction, of the original image read by said reading means.

2. An apparatus according to claim 1, wherein said first and second detecting means comprise a transparent sheet with matrix stripes.

3. An apparatus according to claim 1, further comprising memory means for storing the outputs from said reading means, and said first detecting means, with correspondence between the stored output from said reading means and the stored output from said first detecting means.

4. An apparatus according to claim 3, wherein, in said memory means, said correspondence between the outputs from said reading means and from said first detecting means is one to one.

5. An image reading apparatus comprising:
reading means for reading an image of an original and for outputting an electric signal corresponding thereto;
designating means for designating location information of the original image;
detecting means for detecting a ramp of the reading direction of said reading means with respect to the original using said designating means; and
means for informing an operator of said apparatus that the ramp has been detected, in response to the detection by said detecting means.

6. An apparatus according to claim 5, wherein said designating means comprises a member including a plurality of lines which are perpendicular to a main scan direction of the original image and which have different intervals therebetween.

7. An apparatus according to claim 6, wherein said detecting means performs a calculation in accordance with two succeeding intervals of said plurality of lines therebetween.

8. An apparatus according to claim 5, further comprising means for controlling said reading means in response to the ramp.

9. An apparatus according to claim 8, wherein said control means inhibits the function of said reading means responsive to detection of the ramp.

10. An image reading apparatus comprising:
means for reading an original image;
first designating means for designating location information of the original image;
second designating means for designating a read timing of the original image; and
means for providing additional information to facilitate reading of the original image,
wherein said providing means comprises at least said first or second designating means.

11. An apparatus according to claim 10, wherein said first designating means comprises a plurality of lines which are perpendicular to a main scan direction of the image information and which have different intervals therebetween.

12. An apparatus according to claim 11, wherein said second designating means comprises a plurality of lines which are perpendicular to a subscan direction of the image information and which are equidistantly spaced apart from each other.

13. An image reading apparatus comprising:
means for reading an original image;
designating means for designating a location of the original image; and
calculating means for calculating a location from which a reading of the original image is started, using said designating means.

14. An image reading apparatus comprising:
means for reading an original image;
designating means for designating a location of the original image; and
calculating means for calculating a location from which a reading of the original image is started, using said designating means,
wherein said designating means comprises a plurality of lines which are perpendicular to a main scan direction and which have different intervals therebetween.

15. An apparatus according to claim 14, wherein said calculating means performs a calculation in accordance with an interval of two succeeding lines of said plurality of lines.

16. An image reading apparatus comprising:
reading means for reading an image of an original by manually scanning the original and for outputting an electrical signal corresponding thereto, said reading means being capable of starting its reading operation from any location on the original;
detecting means for detecting absolute location information of the original image read by said reading means; and
generating means for generating a synchronization signal for reading out the image of the original in synchronization with manual scanning of said reading means.

17. An image reading apparatus according to claim 16, wherein said detecting means detects absolute location in a direction perpendicular to a scanning direction of said reading means.

18. An image reading apparatus according to claim 16, wherein said detecting means comprises a transparent sheet with matrix stripes.

19. An apparatus according to claim 16, further comprising memory means for storing outputs from said reading means and said detecting means, with correspondence between the stored output from said reading means and the stored output from said first detecting means.

20. An apparatus according to claim 19, wherein, in said memory means, said correspondence between the outputs from said reading means and from said detecting means is one to one.

* * * * *